United States Patent
Delfer et al.

(10) Patent No.: US 8,437,014 B2
(45) Date of Patent: May 7, 2013

(54) PAPER HANDLING SYSTEM FOR UTILIZATION WITH A LAZY-PORTRAIT FORMATTING DOCUMENT PRINTING SYSTEM

(75) Inventors: Frank W. Delfer, Granite Bay, CA (US); Charles B. Clupper, El Dorado Hills, CA (US); Marc J. Fagan, Folsom, CA (US); Brett Jay Flickner, Folsom, CA (US); Matthew Thomas Leettola, El Dorado Hills, CA (US); John Lawrence Arndt, El Dorado Hills, CA (US)

(73) Assignee: DST Output, El Dorado Hills, CA (US)

( * ) Notice: Subject to any disclaimer, the term of this patent is extended or adjusted under 35 U.S.C. 154(b) by 1142 days.

(21) Appl. No.: 12/112,744

(22) Filed: Apr. 30, 2008

(65) Prior Publication Data

US 2008/0285063 A1 Nov. 20, 2008

Related U.S. Application Data

(63) Continuation-in-part of application No. 11/708,782, filed on Feb. 21, 2007, which is a continuation-in-part of application No. 11/492,594, filed on Jul. 25, 2006.

(60) Provisional application No. 60/927,275, filed on May 1, 2007.

(51) Int. Cl.
- *B42B 2/00* (2006.01)
- *B65H 20/30* (2006.01)
- *B65H 23/04* (2006.01)
- *B65H 43/08* (2006.01)

(52) U.S. Cl.
USPC ............... 358/1.12; 270/52.09; 270/52.08; 270/52.12; 226/118.3; 226/196.1; 226/21

(58) Field of Classification Search ............ 226/21, 226/118.3; 270/52.08; 700/221
See application file for complete search history.

(56) References Cited

U.S. PATENT DOCUMENTS

| 4,307,958 | A |   | 12/1981 | McIrvine |
| 4,928,252 | A |   | 5/1990 | Gabbe et al. |
| 5,104,104 | A | * | 4/1992 | Mol .................... 270/52.08 |
| 5,104,245 | A |   | 4/1992 | Oguri et al. |
| 5,643,399 | A | * | 7/1997 | Venable ................ 156/494 |
| 5,726,897 | A | * | 3/1998 | Tammi et al. ............ 700/221 |

(Continued)

FOREIGN PATENT DOCUMENTS

| EP | 1174327 A3 | 1/2002 |
| EP | 1524169 A1 | 4/2005 |

(Continued)

*Primary Examiner* — Akwasi M Sarpong
(74) *Attorney, Agent, or Firm* — James M. Ritchey

(57) ABSTRACT

A printed sheet handling system and method for use with lazy-portrait narrow-end to narrow-end (LPEE) formatted pages web printed pages to produce document sets includes: a printer to print LPEE formatted paired document pages on a continuous web; a slitter that divides the LPEE formatted printed web into two streams of sheets; collecting each stream in separate rolls of continuous sheets; withdrawing the stream of continuous sheets from a top of one roll, rotating the second roll 180°, and withdrawing the stream of continuous sheets from a bottom of the second roll; transferring each of the unwound streams of continuous sheets to a cutter that cuts each stream into individual pages; and collating the individual pages into correctly aligned and page number-sequenced document sets.

32 Claims, 5 Drawing Sheets

U.S. PATENT DOCUMENTS

| | | |
|---|---|---|
| 5,825,996 A | 10/1998 | Davis et al. |
| 5,887,126 A | 3/1999 | Fujimoto |
| 5,947,461 A * | 9/1999 | Holbrock .................. 270/52.09 |
| 5,995,721 A | 11/1999 | Rourke et al. |
| 6,027,003 A * | 2/2000 | Gassner .................... 226/118.3 |
| 6,050,191 A | 4/2000 | Enderle et al. |
| 6,092,761 A | 7/2000 | Mushaben |
| 6,222,635 B1 | 4/2001 | Gotoh |
| 6,313,822 B1 | 11/2001 | McKay et al. |
| 6,337,745 B1 | 1/2002 | Aiello, Jr. et al. |
| 6,417,931 B2 | 7/2002 | Mori et al. |
| 6,507,411 B1 | 1/2003 | Nishikawa et al. |
| 6,509,977 B1 | 1/2003 | Kujirai et al. |
| 6,559,971 B1 | 5/2003 | Watts et al. |
| 6,705,702 B2 | 3/2004 | Gunther et al. |
| 6,813,038 B1 | 11/2004 | Kadowski |
| 6,994,005 B2 * | 2/2006 | Lamothe ........................ 83/156 |
| 7,014,182 B2 | 3/2006 | Marsh |

FOREIGN PATENT DOCUMENTS

| | | |
|---|---|---|
| JP | 08-179576 A | 7/1996 |
| JP | 2000-141793 A | 5/2000 |
| JP | 2000-229751 A | 8/2000 |
| JP | 2003-011452 A | 1/2003 |
| JP | 2005-297952 A | 10/2005 |
| JP | 2005-320104 A | 11/2005 |
| JP | 2006-273158 A | 10/2006 |

* cited by examiner

US 8,437,014 B2

PAPER HANDLING SYSTEM FOR UTILIZATION WITH A LAZY-PORTRAIT FORMATTING DOCUMENT PRINTING SYSTEM

CROSS-REFERENCE TO RELATED APPLICATIONS

This application is a continuation-in-part of U.S. application Ser. No. 11/708,782 filed on Feb. 21, 2007, which is a continuation-in-part of U.S. application Ser. No. 11/492,594 filed on Jul. 25, 2006. This application claims priority from U.S. provisional application Ser. No. 60/927,275 filed on May 1, 2007.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries.

The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to a system and method for handling lazy-portrait printed documents (printing across the continuous paper web to produce paired portrait orientated pages or in "lazy-portrait narrow-end to narrow-end" formatting (LPEE)) so as to generate acceptably oriented pages that are then processed and grouped into pre-designated document sets with continuously numbered pages. More particularly, to a system and method that flips over one half of the LPEE formatted printed paired pages, which permits a desired reorientation of that half of the LPEE formatted printed paired pages to facilitate further processing in a correctly oriented and correctly ordered page-sequence for assembled document sets, wherein when LPEE formatted head-to-head or bottom-to-bottom paired pages are printed, one half of the printed pairs must be flipped over for generation of the correctly ordered page-sequent count in each final assembled document set.

2. Description of Related Art

To fully understand the subject invention, it is deemed worthwhile to stress the difference between existing/traditional "two-up portrait" versus the current and novel subject "lazy-portrait" printing styles and the documents produced by each type of printing scheme. Existing high-speed duplex variable data printing is carried out most frequently with continuous form printers using what is termed a "two-up portrait" format on a continuous web of paper. Two portrait printed sheets are printed side-by-side (both oriented in the same exact direction. This process, the standard in the industry, produces a continuous output of pages where, for example, the first four sheets (eight pages, front and back on four, eventually separate, sheets) appear as shown in FIG. 1-Prior Art. Currently, an advantage of printing in the prior art format is that it is compatible with more existing printers and more existing post-printing equipment for handling the printed sheets. A critical element of the prior art printing method is that to print either black or color markings on both pages, with the headings in color and the body in black, both the black and color-capable printing heads must span the entire width (long-side to long-side of a page) of both the duplexed sheets, $W^B$ and $W^C$, respectively (see FIG. 1-Prior Art). Examples of printers that function in this manner are the IBM InfoPrint 4000 and Oce VarioStream 7000. In a typical prior art printing system a continuous stream of traditionally printed sheets (such as the ones shown in FIG. 1-Prior Art) is printed and then moves into a slitter that separates the single steam into two streams of continuous sheets that then enter a cutter and collator for further processing to generate correctly page-sequenced document sets.

For the sake of clarity in relating the subject invention, the dramatic differences between the subject invention and traditional printing techniques is discussed. For the current subject invention the continuous web is printed in a lazy-portrait narrow-end to narrow-end (LPEE) format (as seen in FIGS. 2 and 3, for four pages and two pages, respectively), which is a means for more efficient and cost effective printing of variable and form data onto paper oriented in a lazy-portrait orientation. The term "lazy-portrait" is defined as a portrait oriented page that is generated by printing the page from one wide edge to the other wide edge (side to side) and not from narrow edge or end to narrow edge or end (top to bottom or visa-versa), as is done in every other currently existing printing system.

The critical issue with the subject invention is that when a pair of head-to-head or bottom-to-bottom pages are printed on a continuous stream of paper, the single stream of paper with the paired images must then be separated/slitted into two separate streams of paper with one stream being flipped over to correctly orient and number-sequence the final pages when cut and stacked into a document set (as seen in FIG. 4 for a pair of LPEE printed sheets). The current subject invention presents a system and method for accomplishing this sheet flipping process by flipping one entire stream of post-slitted sheets.

Again, it is noted that conventional/traditional paper handling systems exist that can transport and process paper printed in the existing and traditional two-up portrait style (not the subject paper LPEE orientation). With traditional systems, future document sets have pages that are already aligned head to head, and existing finishing, cutting, and inserting equipment readily handles the orientation of the two-up portrait printed paper by slitting the two-up portrait web of paper in either first to last (1 to N) or last to first (N to 1) document page-sequencing.

U.S. Pat. No. 6,994,005 (an apparatus for slitting, merging, and cutting a continuous paper web) describes an in-line turn-bar that is positioned after slitting and prior to merging the two streams, but this invention only positionally moves one slit lane of paper to overlap with another slit lane of paper, without turning over the obverse to reverse orientation (or face to back orientation). This patent differs from the subject invention in that, since there is no need, suggestion, or teaching to do so, it does not turn over the paper orientation.

U.S. Pat. No. 6,595,465 (a turn-bar assembly for redirecting a continuous paper web) describes turning a single web of paper to reorient the travel direction and, in addition, to optionally flip the paper web from obverse to reverse (face up to face down) image orientation in this reoriented travel direction. This patent differs from the subject invention in that it reorients the paper direction, which is not associated with the manner in which a turn-bar is employed in the subject invention.

U.S. Pat. No. 7,021,184 discloses a system and method for providing sheets to an inserter system using a rotary cutter. The '184 patent demonstrates using a turn-bar after the sheets have been cut from a continuous roll of paper. Unlike the '184 system, the subject invention uses a turn-bar before cutting the sheets in a cutter.

With the subject invention, a significant benefit of utilizing a turn-bar after the paper unwinder and before the cutter is that the work-cell layout can be optimized for space and material handling purposes. Additionally, a benefit of this method, as it applies to LPEE printing, is that the paper sheet reorientation through flipping one of the two streams does not require additional equipment at either the printer or insert.

BRIEF SUMMARY OF THE INVENTION

An object of the present invention is to provide a paper handling system that orients lazy-portrait narrow-end to narrow-end format printed sheets into correctly oriented and page-sequenced document sets.

Another object of the present invention is to furnish a paper handling system that flips one of two paired lazy-portrait narrow-end to narrow-end format printed sheets to generate printed sheets that have correctly sequenced pages that are assembled into desired document sets.

A further object of the present invention is to supply a paper handling system that produces correctly oriented and page-sequenced document sets from a continuous web of lazy-portrait narrow-end to narrow-end (LPEE) format paired printed sheets by slitting a continuous stream of LPEE paired sheets into two streams, flipping one of the two streams, cutting each stream, and collating the cut sheets into correctly page-sequenced document sets.

Still another object of the present invention is to disclose a method that orients lazy-portrait narrow-end to narrow-end format printed sheets into correctly oriented and page-sequenced document sets.

Yet a further object of the present invention is to describe a method that flips one of two paired lazy-portrait narrow-end to narrow-end format printed sheets to generate printed sheets that have correctly oriented and sequenced pages that are assembled into desired document sets.

Still yet another object of the present invention is to relate a method that produces correctly oriented and page-sequenced document sets from a continuous web of lazy-portrait narrow-end to narrow-end (LPEE) format paired printed sheets by slitting a continuous stream of LPEE paired sheets into two streams, flipping one of the two streams, cutting each stream, and collating the cut sheets into correctly page-sequenced document sets.

Yet an additional object of the present invention is to disclose a paper handling system and method of use that produces correctly oriented and page-sequenced document sets from a continuous web of lazy-portrait narrow-end to narrow-end (LPEE) format paired printed sheets by slitting a continuous stream of LPEE paired sheets into two streams, rolling each stream of sheets into a separate roll, flipping one roll 180°, withdrawing each continuous stream sheets from the top of one roll and the bottom of the 180°-flipped roll, thereby correctly orienting and page-sequencing the printed pages, optionally passing each of the withdrawn streams of continuous sheets through a turn-bar device, cutting each stream, and collating the cut sheets into the final correctly oriented and page-sequenced document sets.

Disclosed is a system and method of use for correctly orienting and page-sequencing individual sheets that were initially printed on a continuous web of paper with a paired lazy-portrait narrow-end to narrow-end (LPEE) formatting. The LPEE formatted printed continuous web is split into two continuous streams of sheets. Both streams of sheets are rolled onto separate rolls. Each roll is then unwound, but one roll is unwound from the top in its original winding orientation and the other roll is rotated/flipped 180° and unwound from the bottom. Each unwound stream is optionally passed through a turn-bar apparatus (to minimize physical space requirements) and sent to a cutter. The two streams are then cut into separate sheets and collated into desired document sets with correctly oriented and page-sequenced sheets. Necessary control and verification means are included in the system to control the process and verify correctly assembled document sets have been generated.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a depiction representing the PRIOR ART, wherein four total sheets are shown with paired/duplexed-document pages printed side-by-side, with all side-by-side pages oriented in traditional portrait-parallel fashion to one another.

FIG. 2 illustrates the subject invention's lazy-portrait documents wherein four total printed sheets are depicted in a duplexed lazy-portrait head-to-head page orientation and printed on the web in two printing lanes (simplexed printing jobs are only printed on one side of a sheet, thereby making assembly of a multi-page document more simplistic than with the duplexed embodiment which requires a sheet flipping process step that is the main focus of the subject invention).

DETAILED DESCRIPTION OF THE INVENTION

Referring more specifically to the drawings, for illustrative purposes the present invention is embodied in the system generally shown in FIG. 2 through FIG. 7. It will be appreciated that the system may vary as to configuration and as to details of the exact components, and that the method may vary as to the specific steps and sequence, without departing from the basic concepts as disclosed herein.

Figure 2:
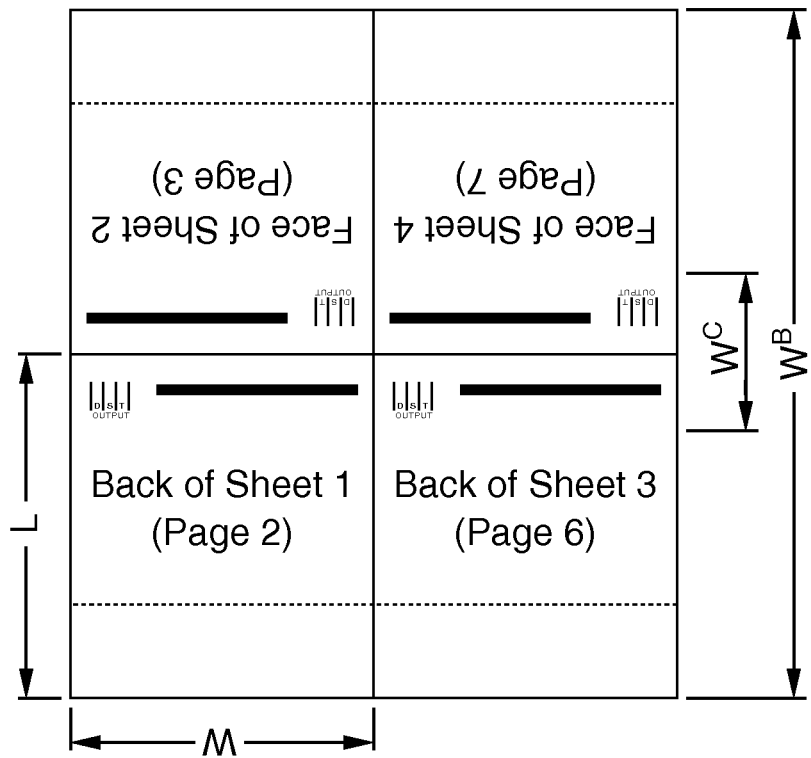
Figure 1:
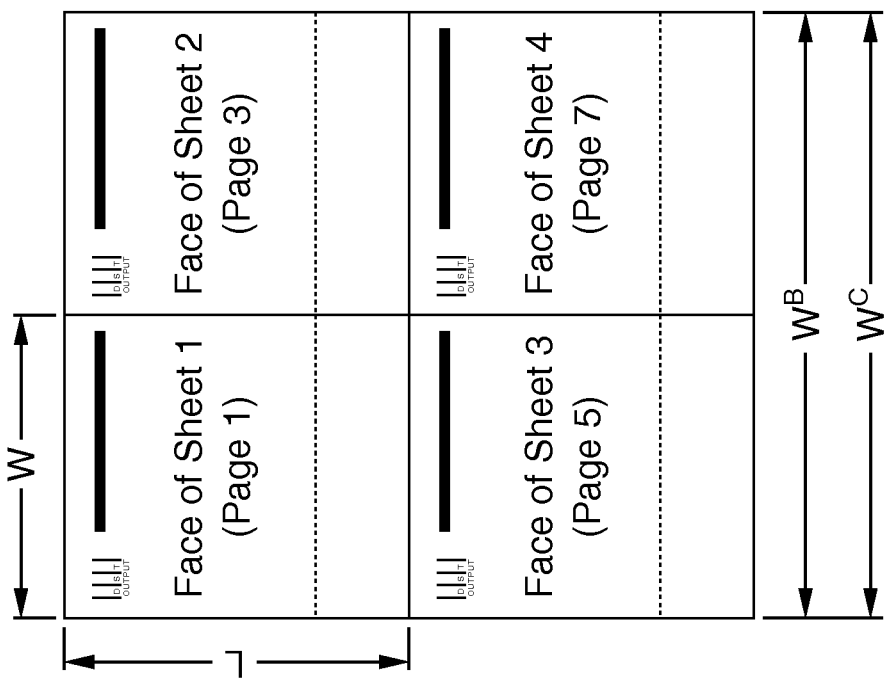
Figure 4:
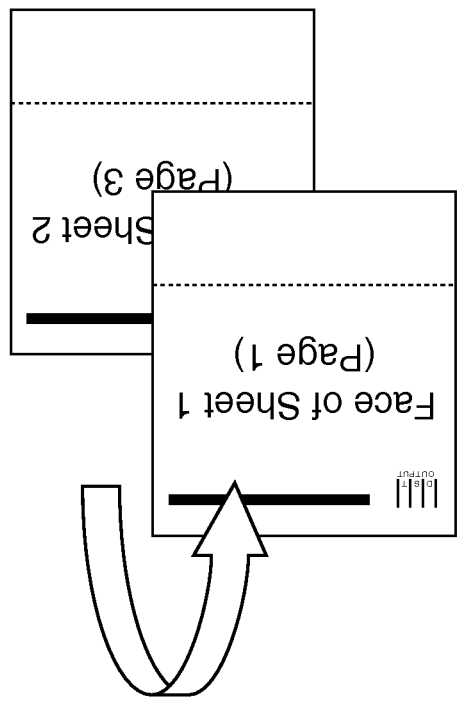
FIG. 4 shows the subject invention's ability to flip one of the paired sheets seen in FIG. 3 to produce correctly page-sequenced sheets (during normal operation, an entire stream of sheets is flipped and matched with its appropriate mate from the original pairing, as directed by a controller that tracks the exact position of each page during the document set processing procedure).
Figure 3:
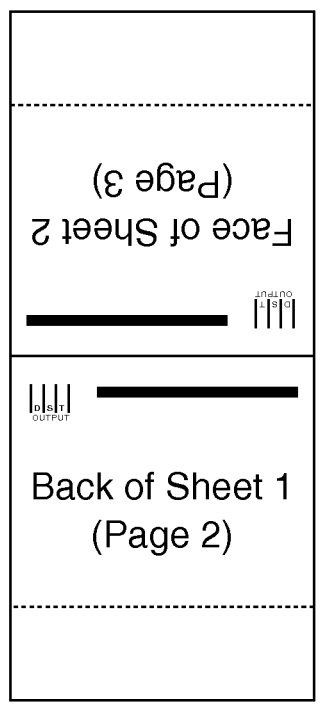
FIG. 3 shows the subject invention's formatting technique that produces lazy-portrait documents wherein a pair of printed sheets is depicted in a duplexed lazy-portrait head-to-head page orientation and printed on a continuous web in two printing lanes.
Figure 5:
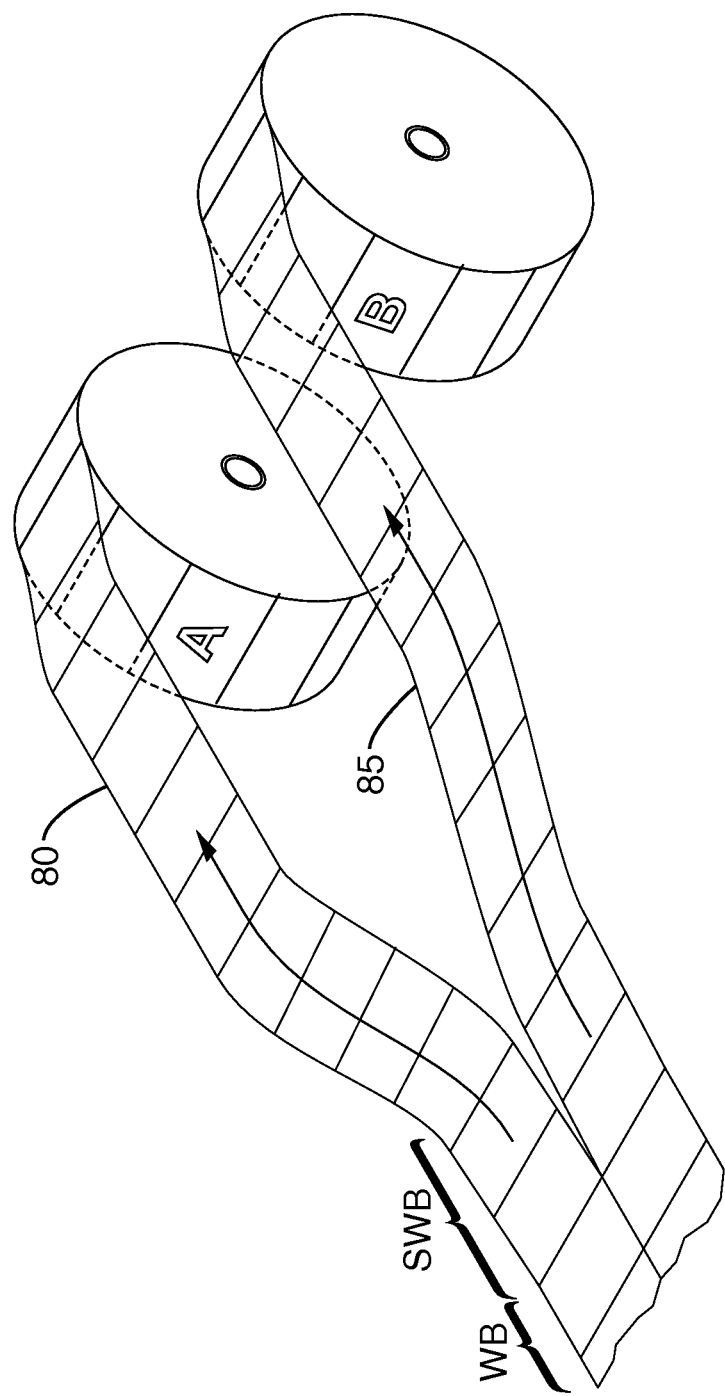
FIG. 5 shows that during the subject method, the LPEE formatted web is first divided into two streams by a slitter and then each one of the streams is collected into a roll.

Since the lazy-portrait narrow-end to narrow-end (LPEE) formatted paper is printed head-to-head (or bottom-to-bottom) in a preferred embodiment of LPEE printing (narrow-end to narrow-end generally) technique, the pages must be reoriented with the heads of all of the sheets in the same orientation and the faces of the sheets on the same side prior to collation (see FIGS. 2-4 and above for a more detailed description of the subject LPEE printing technique and generated paired pages). The subject invention accomplishes this requirement in a novel and efficient process. As shown in FIG. 5, the LPEE formatted web WB (coming in on the far left) has both lanes of data printed with the LPEE paired information. The LPEE formatted web is then slit SWB into two streams of continuous sheets 80 and 85. Each of these streams 80 and 85 are wound into Roll A and Roll B (or since the original non-printed-on continuous web material is usually initially rolled, the production of these two new rolls may be termed "rewound" rolls). Often, the two rolls of LPEE formatted paper Roll A and Roll B may be up to fifty inches in diameter. An example of the type of rewinder (or winder) capable of this process is the Dusenbery Model 485 Slitter Rewinder.

Figure 6:
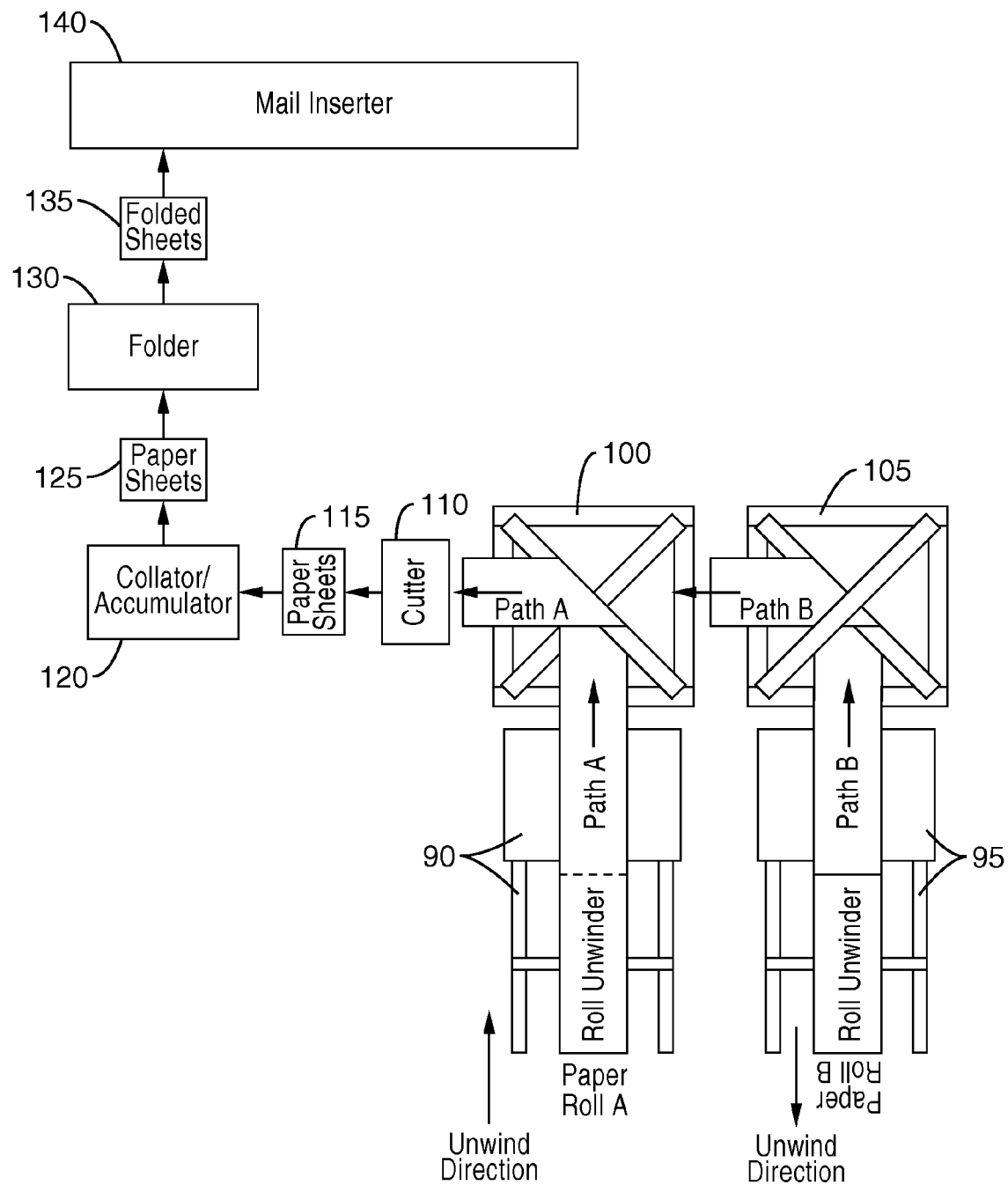
FIG. 6 shows a first embodiment of the subject invention.

FIG. 6 depicts one embodiment of the subject invention. Usually, though not necessarily, the two rolls of LPEE formatted paper Roll A and Roll B are moved to a location in which they will be unwound, frequently in a process of generating mail items that are formed via utilization of required assembly devices (such as: folder, mail insert, and the like). Due to the inherent nature of the subject LPEE formatting, one roll of paper has the data printed face up (Roll A) and the other roll of paper has the data printed face down (Roll B). In order to reorient the paper so that both paper paths have the correct leading edge presented to the paper cutter (for correct orientation of page heads and page-sequences), one paper path is reversed 180° by rotating the finished roll (Roll B) prior to unwinding and withdrawing off the bottom of this roll (Roll B). The rotation of Roll B may be accomplished by any suitable means such as physically turning the roll around or any equivalent action. As described, the Roll B rotation process results in one roll (Roll B in FIG. 6) unwinding on the bottom of the roll in one unwind direction (Path B in FIG. 6). Roll A is unwound from the top of the roll in the opposite unwind direction, relative to Roll B. It must be appreciated that the 180° rotation of Roll B, when coupled with withdrawing from the bottom of Roll B and the top of Roll A automatically generates properly oriented and page-sequenced future document sets when the two withdrawn streams overlap each other. Unwinders capable of unwinding the rolls of paper in this manner are commercially available such as the Energy Saving Products and Sales Corporation (ESP) Model ESP400 unwinder.

Additionally, as a novel and non-obvious invention in its own right, turn-bar assemblies are utilized in both paths after unwinding and before the cutter (which allows maximum space utilization during assembly of desired document sets and insertion into mailing pieces). The turn-bars utilized in the subject invention are commercially available, like the Foltz Machine, Inc turn-bar assembly.

Figure 7:
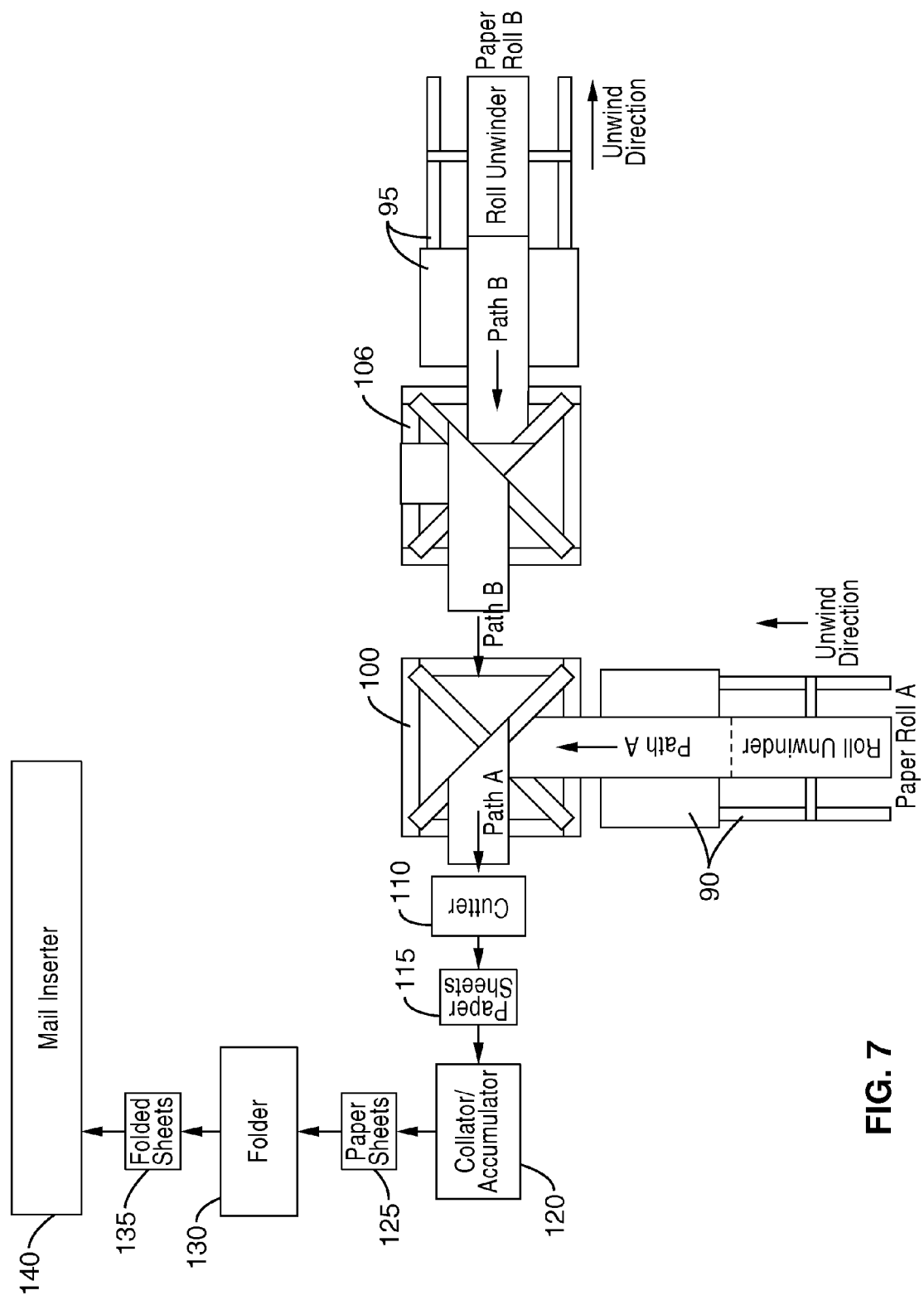
FIG. 7 shows a second embodiment of the subject invention.

Subsequent to rotating Roll B through 180°, the subject invention, both system and method, is presented in two embodiments, on in FIG. 6 and one in FIG. 7. In FIG. 6 Roll A in mounted on a roll unwinder 90 and Roll B on roll unwinder 95. As indicated, the unwind direction brings the continuous LPEE formatted sheets off the top of Roll A and into paper Path A. The unwind direction for Roll B is off the bottom and into paper Path B (since it has been rotated 180° from the orientation during winding). It is stressed that this combined rotation and bottom stream removal from Roll B coupled with the top stream removal from Roll A generates correctly oriented and page-sequenced future document sets, in and of itself, however, to save space needed in the overall document and mail piece assembly process the addition of turn-bar assemblies is useful and novel. For paper Path A, from Roll A, the stream enters a turn-bar assembly 100 that turns the stream approximately 90°, while flipping the sheets. In a similar fashion, for paper Path B, from rotated Roll B, the stream enters a turn-bar assembly 105 that turns the stream approximately 90°, while flipping the sheets. Path A and Path B present overlapping streams of sheets to the cutter 110 that cuts the two streams into individual sheets 115. The individual sheets are transported to a collator or accumulator 120 that assembles the necessary individual sheets into document sets 125 that are then moved into a folder 130. The folded document sets 135 are then transported to a mail inserter for mail piece assembly. Having the two turn-bar assemblies 100 and 105 positioned to alter Path A and Path B in perpendicular directions to the cutter-to-collator axis permits the grouping of required devices to be in a more compact physical space than having both unwinders 90 and 95 positioned parallel to the cutter-to-collator axis.

As seen in FIG. 7, in another embodiment of the subject invention, a further way to accomplish the correct page orientations and page-sequences is to unwind Roll A on roll unwinder 90 and use turn-bar assembly 100 in the same manner as discussed above, to then position Roll B directly along the cutter-to-collator axis and transport paper Path B through turn-bar assembly to flip the stream, yet direct it straight out the opposite side of the turn-bar assembly 106. This configuration again generates correctly oriented pages and page-sequence in the final document sets. It is noted, that based on utilization of turn-bar assemblies before the cutter and after the unwinders, that the desired layout of a work-cell area may be varied to minimize space and maximize efficiency and that several other equivalent embodiment configurations of this reorientation process are available and are within the realm of this disclosure.

A suitable control and verification means are associated with the subject system and method. Those means implement the subject invention by generating printed pages from input data, tracking printed pages through the slitter, subject flipping process, cutter, and collator, and verifying the process is functioning properly and that correctly page-sequenced document sets are created. Appropriately designed computer programs control the LPEE printing process, necessary paper transport and flipping processes (tracking all pages and which are place into which final document sets), the slitting device, the cutting equipment, the collation of correctly page-sequenced document sets, and any additional post collation processes. Once familiar with the subject invention, such programming abilities are within the skill of those programmers familiar with high-speed printing techniques, requirements, and equipment.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A printed sheet handling system for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising:
   a. means for printing the LPEE formatted paired document sheets on the web;
   b. means for slitting said LPEE formatted paired document sheets into a first stream of sheets and a second stream of sheets;
   c. means for winding said streams into a first roll and a second roll;
   d. means for rotating said second roll 180°;
   e. means for withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets; and
   f. means for cutting said first and second withdrawn streams into individual sheets and collating said individual sheets into document sets having said correctly number-sequenced pages.

2. A system according to claim 1, further comprising a computer and programming means for controlling the operation of the system and verifying correct assembly of multi-sheet document sets.

3. A system according to claim 1, further comprising a first turn-bar assembly associated with said first withdrawn stream and a second turn-bar assembly associated with said second withdrawn stream, wherein both said first and said second turn-bar assemblies are positioned before said cutting means.

4. A system according to claim 1, wherein said printing means comprises a continuous web printer operating with LPEE format programming.

5. A system according to claim 1, wherein said slitting means comprises a slitter device through which the LPEE formatted web passes and is separated into to streams of continuous sheets.

6. A system according to claim 1, wherein said winding means comprises a winder device that winds said first stream of sheets into said first roll and said second stream of sheets into said second roll.

7. A system according to claim 1, wherein said rotating means comprises a device for physically rotating said second roll through an 180° rotation.

8. A system according to claim 1, wherein said cutting means comprises a cutter for producing individual sheets from said first and second streams and said collating means comprises a collator for collating said individual sheets from both said first and said second streams into correctly oriented and page-sequenced document sets.

9. A printed sheet handling system for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising:
   a. means for printing the LPEE formatted paired document sheets on the web;
   b. means for slitting said LPEE formatted paired document pages into a first stream of sheets and a second stream of sheets;
   c. means for winding said streams into a first roll and a second roll;
   d. means for rotating said second roll 180°;
   e. means for withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets;
   f. means for cutting said first and second withdrawn streams into individual sheets and collating said individual sheets into document sets; and
   means for controlling the operation of the system and verifying correct assembly of document sets; and
   g. means for controlling the operation of the system and verifying correct assembly of multi-sheet document sets.

10. A system according to claim 9, further comprising a first turn-bar assembly associated with said first withdrawn stream and a second turn-bar assembly associated with said second withdrawn stream, wherein both said first and said second turn-bar assemblies are positioned before said cutting means.

11. A printed sheet handling system for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising:
  a. means for printing the LPEE formatted paired document sheets on the web;
  b. means for slitting said LPEE formatted paired document sheets into a first stream of sheets and a second stream of sheets;
  c. means for winding said streams into a first roll and a second roll;
  d. means for rotating said second roll 180°;
  e. means for withdrawing said first stream from a top of said first roll and said second stream from a bottom of said 180° rotated second roll, thereby flipping over printed information on said second stream sheets relative to printed information on said first stream of sheets, thus correctly orienting and page-sequencinq the printed multi-sheet document sets;
  f. first turn-bar means through which said first stream travels after said top withdrawal;
  g. second turn-bar means through which said second stream travel after said bottom withdrawal; and
  h. means for cutting said first and second withdrawn streams into individual sheets and collating said individual sheets into document sets; and means for controlling the operation of the system and verifying correct assembly of multi-sheet document sets.

12. A system according to claim 11, further comprising a computer with programming means for controlling the operation of the system and verifying correct assembly of multi-sheet document sets.

13. A system according to claim 11, wherein said first and second turn-bar means are each a turn-bar assembly, wherein said first and second turn-bar assemblies are utilized to alter a directional path for each of said top and said bottom withdrawn streams.

14. A system according to claim 11, wherein said first and second turn-bar means are each a turn-bar assembly, wherein said first turn-bar assembly is utilized to alter a directional path for at least said top withdrawn stream.

15. A printed sheet handling system for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising:
  a. means for printing the LPEE formatted paired document sheets on the web;
  b. means for slitting said LPEE formatted paired document sheets into a first stream of sheets and a second stream of sheets pages;
  c. means for winding said streams into a first roll and a second roll;
  d. means for rotating said second roll 180°;
  e. means for withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets;
  f. first turn-bar means through which said first stream travels after said top withdrawal, wherein said first turn-bar means is utilized to alter a directional path for said top withdrawn stream;
  g. second turn-bar means through which said second stream travel after said bottom withdrawal;
  h. means for cutting said first and second withdrawn streams into individual sheets and collating said individual sheets into document sets; and means for controlling the operation of the system and verifying correct assembly of multi-sheet document sets; and
  i. a computer having programming means for controlling the operation of the system and verifying correct assembly of multi-sheet document sets.

16. For use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, a page orientating and page-sequencing process for creating combined multi-sheet document sets, comprising the steps:
  a. printing the LPEE formatted continuous web;
  b. slitting said LPEE formatted printed continuous web into first and second continuous streams of sheets;
  c. winding said first and second continuous streams of sheets into first and second separate rolls of continuous sheets;
  d. unwinding said first roll from a top;
  e. rotating said second roll 180°;
  f. unwinding said rotated second roll from a bottom, thereby flipping over printed information on said second stream sheets relative to printed information on said first stream of sheets, thus correctly orienting and page-sequencing the printed multi-sheet document sets; and
  g. transporting both said continuous streams of sheets from said unwound rolls to a cutter and collator thereby creating correctly oriented and page-sequenced combined multi-sheet document sets.

17. A process according to claim 16, further comprising the step of passing each said unwound continuous stream of sheets through a turn-bar apparatus before entry into said cutter.

18. A printed sheet handling method for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising the steps:
  a. printing the LPEE formatted paired document sheets on the web;
  b. slitting said LPEE formatted paired document sheets into a first stream of sheets and a second stream of sheets;
  c. winding said streams into a first roll and a second roll;
  d. rotating said second roll 180°;
  e. withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets; and
  f. cutting said first and second withdrawn streams into individual sheets and collating said individual sheets into multi-sheet document sets.

19. A method according to claim 18, further comprising steps for controlling the operation of the system and verifying correct assembly of multi-sheet document sets by means of a computer having the necessary programming.

20. A method according to claim 18, further comprising the steps of withdrawing said first top stream through a first turn-bar assembly and a withdrawing said bottom stream through a second turn-bar assembly, wherein both said first and said second turn-bar assemblies are positioned before said cutting means.

21. A method according to claim 18, wherein said printing is by means of a continuous web printer operating with LPEE format programming.

22. A method according to claim 18, wherein slitting is by means of a slitter device through which the LPEE formatted web passes and is separated into to streams of continuous sheets.

23. A method according to claim 18, wherein winding is by means of a winder device that winds said first stream of sheets into said first roll and said second stream of sheets into said second roll.

24. A method according to claim 18, wherein rotating is by means of a device for physically rotating said second roll through an 180° rotation.

25. A method according to claim 18, wherein cutting is by means of a cutter for producing individual sheets from said first and second streams and said collating means comprises a collator for collating said individual sheets from both said first and said second streams into correctly oriented and page-sequenced multi-sheet document sets.

26. A printed sheet handling method for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising the steps:
  a. printing the LPEE formatted paired document sheets on the web;
  b. slitting said LPEE formatted paired document sheets into a first stream of sheets and a second stream of sheets;
  c. winding said streams into a first roll and a second roll;
  d. rotating said second roll 180°;
  e. withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets;
  f. cutting said first and second withdrawn streams into individual sheets and collating said individual sheets pages into document sets; and
  g. controlling the operation of the system and verifying correct assembly of multi-sheet document sets by means of a computer having the necessary programming.

27. A method according to claim 26, further comprising the steps of passing said first withdrawn stream through a first turn-bar assembly and passing said second withdrawn stream through a second turn-bar assembly, wherein both said first and said second turn-bar assemblies are positioned before said cutting means.

28. A printed sheet handling method for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising the steps:
  a. printing the LPEE formatted paired document sheets on the web;
  b. slitting said LPEE formatted paired document sheets into a first stream of sheets and a second stream of sheets;
  c. winding said streams into a first roll and a second roll;
  d. rotating said second roll 180°;
  e. withdrawing said first stream from a top of said first roll and said second stream from a bottom of said 180° rotated second roll, thereby flipping over printed information on said second stream sheets relative to printed information on said first stream of sheets, thus correctly orienting and page-sequencing the printed multi-sheet document sets;
  f. directing said first stream after said top withdrawal through a first turn-bar means;
  g. directing said second stream after said bottom withdrawal through a second turn-bar means; and
  h. cutting said first and second withdrawn streams, after passing through said first and said second turn-bar means, into individual sheets and collating said individual sheets into multi-sheet document sets.

29. A method according to claim 28, further comprising steps for controlling the operation of the system and verifying correct assembly of multi-sheet document sets by LPEE format containing programming within a computer.

30. A method according to claim 28, wherein said first and second turn-bar means are each a turn-bar assembly, wherein said first and second turn-bar assemblies are utilized to alter a directional path for each of said top and said bottom withdrawn streams.

31. A method according to claim 28, wherein said first and second turn-bar means are each a turn-bar assembly, wherein said first turn-bar assembly is utilized to alter a directional path for at least said top withdrawn stream.

32. A printed sheet handling method for use with lazy-portrait narrow-end to narrow-end (LPEE) formatted documents comprised of one or more material sheets with each material sheet having a top narrow-edge, a distal bottom narrow-edge, and two side long-edges and printed merged document information having a head region and a bottom region, wherein the printed merged document information head region is printed proximate one of said material sheet narrow-edges on a continuous web of printable material to produce paired document sheets, wherein the continuous web has a direction of motion during the document printing process, wherein combined multi-sheet document sets produced from the LPEE formatted paired document sheets are correctly aligned head-to-head and with correctly number-sequenced pages, comprising the steps:
 a. printing the LPEE formatted paired document sheets on the web;
 b. slitting said LPEE formatted paired document sheets into a first stream of sheets and a second stream of sheets;
 c. winding said streams into a first roll and a second roll;
 d. rotating said second roll 180°;
 e. withdrawing said first stream from a top of said first roll and said second stream from a bottom of said 180° rotated second roll, thereby flipping over printed information on said second stream sheets relative to printed information on said first stream of sheets, thus correctly orienting and page-sequencinq the printed multi-sheet document sets;
 f. directing said first stream after said top withdrawal through a first turn-bar means, wherein said first turn-bar means is utilized to alter a directional path for said top withdrawn stream;
 g. directing said second stream after said bottom withdrawal through a second turn-bar means;
 h. cutting said first and second withdrawn streams into individual pages and collating said individual pages into document sets; and
 i. controlling the operation of the system and verifying correct assembly of multi-sheet document sets by LPEE format containing programming.

* * * * *